UNITED STATES PATENT OFFICE.

OLIVER R. CHASE, OF BOSTON, MASSACHUSETTS.

WAXED PAPER.

SPECIFICATION forming part of Letters Patent No. 247,481, dated September 27, 1881.

Application filed January 29, 1881. (Specimens.)

*To all whom it may concern:*

Be it known that I, OLIVER RICE CHASE, of Boston, in the county of Suffolk and State of Massachusetts, have invented certain new and useful Improvements in Waxed Papers; and I do hereby declare that the following is a full, clear, and exact description of the invention, which will enable others skilled in the art to which it appertains to make and use the same.

My invention has reference to the article known in commerce as "waxed paper," a class of papers treated with compositions for the purpose of making them air and water proof and proper to be used for wrapping and protecting confectionery, medical preparations, drugs, butter, soap, tobacco, and other articles injuriously affected by atmospheric changes. After numerous experiments with compositions for this purpose, I have found that by the admixture of rosin with paraffine, beeswax, or other similar substance, in substantially the proportions hereinafter named, I am able, without the use of other ingredients, to produce a composition which, applied to paper, cloth, and other like materials, will render them more thoroughly air-proof and water-proof than has hitherto been accomplished by the complex compositions used for that purpose, and to give them a more beautiful, inadhesive, enamel finish, and make them less liable to be injuriously affected by heat, dampness, or the rough usage incidental to the handling of commercial packages.

In carrying out my invention I take one pound of clear rosin and three pounds of paraffine, beeswax, or vegetable wax, preferably paraffine, and incorporate them together by melting, and in the mixture so prepared I immerse the paper or cloth to be treated, and afterward smooth it off by heated irons or other suitable means.

I do not confine myself absolutely to the exact proportion above named, as somewhat more or less of the rosin or of the paraffine may be employed, as may be found desirable for any particular quality or style of paper.

What I claim and desire to secure is—

1. In the manufacture of waxed paper or cloth, the combination of rosin and wax in the manner, substantially in the proportions, and for the purposes set forth.

2. As a new article of manufacture, paper or cloth treated with a mixture of wax and rosin, substantially in the proportions and in the manner set forth.

In testimony that I claim the foregoing as my own invention I affix my signature in presence of two witnesses.

OLIVER RICE CHASE.

Witnesses:
WM. B. H. DOWSE,
WM. B. DURANT.